United States Patent [19]
Ziolkowski

[11] 4,326,271
[45] Apr. 20, 1982

[54] METHOD AND APPARATUS FOR DETERMINING ACOUSTIC PROPERTIES IN THE EARTH

[76] Inventor: Antoni M. Ziolkowski, 11 Heatherdene Mansions, Cambridge Rd., Twickenham, Middlesex, England

[21] Appl. No.: 142,925

[22] Filed: Apr. 23, 1980

[30] Foreign Application Priority Data

Apr. 23, 1979 [GB] United Kingdom ............... 14039/79

[51] Int. Cl.³ .......................... G01V 1/13; G01V 1/38
[52] U.S. Cl. ....................................... 367/16; 367/56; 181/111
[58] Field of Search ............................ 367/15, 16, 56; 181/111, 115, 118; 73/641

[56] References Cited

U.S. PATENT DOCUMENTS

| | | | |
|---|---|---|---|
| 2,672,204 | 3/1954 | Paultes | 367/56 |
| 3,479,638 | 11/1969 | Rusnak | 367/56 |
| 3,893,539 | 7/1975 | Mott-Smith | 181/111 |
| 4,038,630 | 7/1977 | Chelminski | 181/111 |
| 4,134,098 | 1/1979 | Ruehle | 181/111 |
| 4,146,871 | 3/1979 | Ruehle | 181/111 |

FOREIGN PATENT DOCUMENTS

826932  1/1960 United Kingdom ............... 181/118

OTHER PUBLICATIONS

Ziolkowski, "Design of a Marine Aismic Reflection ... Using Air Guns as a Sound Source", 10/71, pp. 499–530, Geophysics J., vol. 23, #5.

*Primary Examiner*—Nelson Moskowitz
*Attorney, Agent, or Firm*—Mason, Kolehmainen, Rathburn & Wyss

[57] ABSTRACT

A method and apparatus for determining the acoustic properties of the earth utilizes one or more identical, non-interacting, first spaced arrays of point sound sources and one or more identical, non-interacting, second spaced arrays of point sound sources with corresponding arrays of the first and second sources containing the same number of point sound sources in the same spatial relationship, with the spacing between the point sources of the second array or arrays being a factor $\alpha$ greater than the spacing between corresponding point sources of the first array or arrays. The energy of the radiation emitted by each point source of the first array(s) is greater than that emitted by the corresponding point sources in the second array(s) by a factor of $\alpha^3$.

17 Claims, 3 Drawing Figures

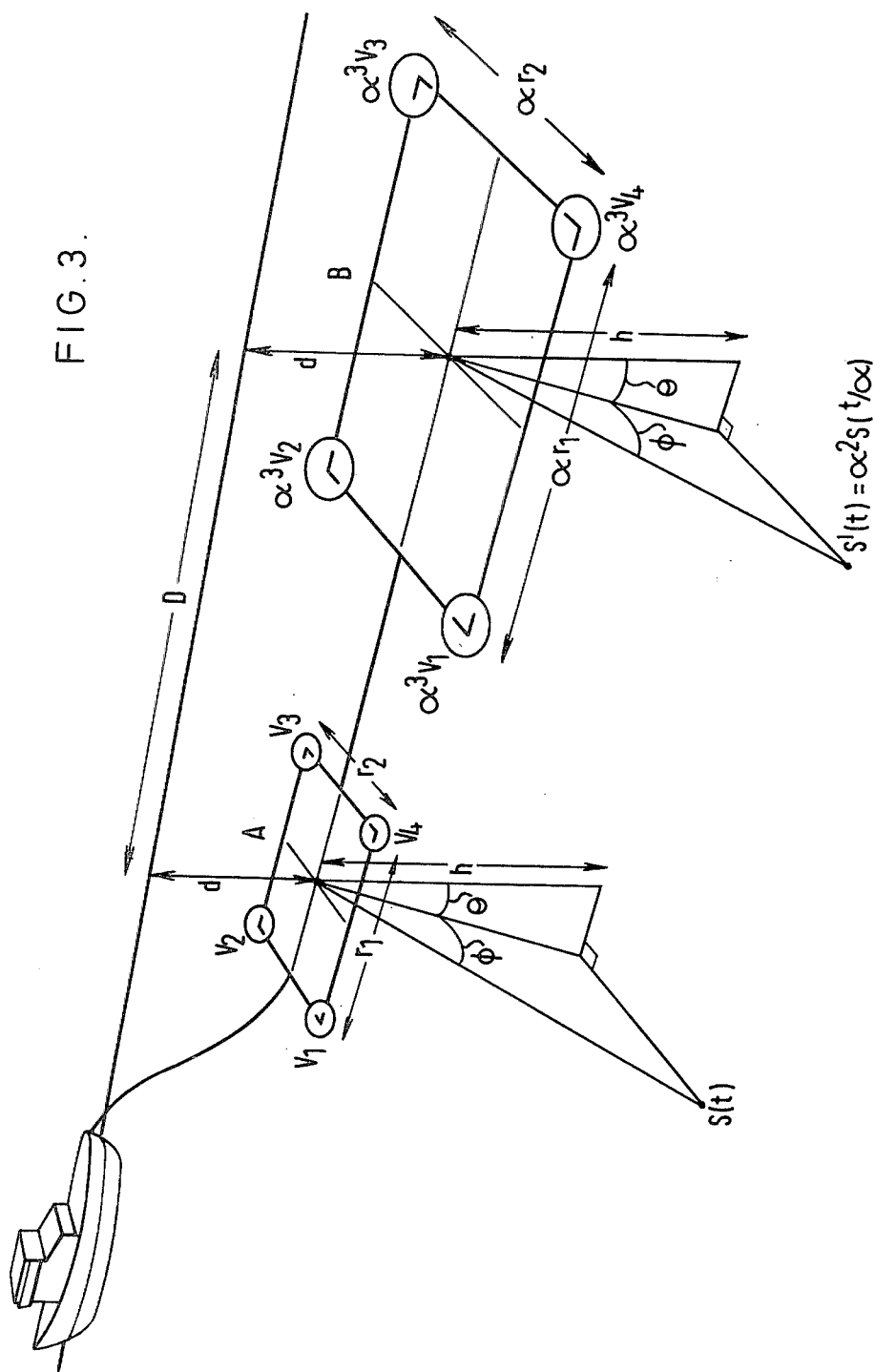

METHOD AND APPARATUS FOR DETERMINING ACOUSTIC PROPERTIES IN THE EARTH

BACKGROUND OF THE INVENTION

This invention relates to a method of determining the location in the earth of sub-surface boundaries and/or the acoustic properties of sub-surface features in the earth and to apparatus for this purpose.

A method and apparatus for this purpose are described in British patent application No. 79 13997 in the name of A. M. Ziolkowski and Seismograph Service (England) Limited which formed the basis for British patent application No. 8,013,438, filed on Apr. 23, 1980, now published as British published patent application No. 204841A which comprises employing one or more first and second point sound sources to produce first and second sound waves containing energies of elastic radiation which differ from each other by a known factor, detecting reflections of said first and second waves to generate first and second seismic signals and subjecting said seismic signals to analysis and comparison.

Whilst the method and apparatus there described do have practical application, this is somewhat limited in that they are applicable only to point sources whose far field radiation has spherical symmetry.

It is very often preferable to employ one or more arrays of sound sources, particularly in a marine environment and such arrays generate radiation which is not spherically symmetric; that is the amplitude and phase of a given frequency of the far field radiation are normally dependent on azimuth.

A distributed array of point sources is used for increasing the power of the source, for shaping the far field wavelet, and for improving the directivity of the radiation. If the distance between individual point sources within such an array is less than about a wavelength, the interaction effects between these individual sources are significant. For most point sources these interaction effects are not well understood, and the far field wavelet of an array of such point sources cannot be calculated from a knowledge of the individual far field source wavelets. It must be measured in the far field. Since this measurement is very often awkward or impossible to make, the far field wavelet of such an array is very often unknown.

Air gun arrays are typical in this respect. Although air guns have many practical advantages, the main disadvantage of an air gun as a sound source is the waveform itself. It lacks power, it has a multi-peaked spectrum and, in the time domain, it is inconveniently long and oscillatory; moreover, it is not minimum-phase. Arrays of air guns are often used in an attempt to overcome all these difficulties simultaneously. Some are more easily overcome than others.

The lack of power and lack of bandwidth are remedied simply by using more guns and by using guns of different sizes. The really intractable problem is the phase spectrum of the far field wavelet. If it were minimum phase a least-squares time-domain inverse deconvolution method could be used to remove the wavelet from the data (provided the earth impulse response were white and stationary). But the standard method of deconvolution does not work, because the wavelet is not minimum phase. It has therefore become essential to design an array to produce a wavelet which is so short that it does not need to be deconvolved from the data.

In recent years air gun array design has concentrated on this shortness aspect of the wavelet, while simultaneously attempting to maintain power and bandwidth. This is difficult to do, for shortness can often be achieved only at the expense of losing some energy in the tail of the wavelet.

There is an important measure of shortness known as "primary-to-bubble" or "front-to-back" ratio. This is usually calculated from broadband measurements of far field wavelets. The shortness ratio decreases as the high cut filter is reduced to simulate earth filtering. In other words, the higher frequency energy is concentrated in the front of the wavelet; as this is removed by earth filtering the amplitude of the front of the wavelet decreases faster than the amplitude of the tail and the wavelet appears to get longer. Therefore deconvolution is still required.

It has been noted that even when the wavelet is short it is not minimum phase. In order to remove it from the seismogram its shape must be known and must, therefore, be measured in the far field. Since the shape of the wavelet tends to change during continuous operation, a continuous monitor of the far field wavelet is necessary to effect an adequate deconvolution. If the water is deep it is possible to tow a hydrophone in the far field below the air gun array and to measure the far field wavelet before reflections from the sea floor arrive.

When the water is shallow, it is not possible to measure this wavelet, and since its shape cannot be calculated, there are only three courses open:

1. to use a deep water measurement and then to hope that the wavelet generated in shallow water does not vary too much from from this measurement;
2. to assume that the shallow water wavelet is minimum-phase (knowing all the time that this is extremely unlikely) and to hope that the standard deconvolution method will work;
3. to forget all about deconvolution.

SUMMARY OF THE INVENTION

According to a first aspect of the present invention there is provided a method of determining the location in the earth of sub-surface boundaries and/or the acoustic properties of sub-surface features in the earth which comprises using one or more identical non-interacting first spaced arrays of point sound sources and one or more identical non-interacting second spaced arrays of point sound sources respectively to generate first and second reflected seismic signals and then subjecting these two seismic signals to analysis and comparison, corresponding array(s) of the first and second sources containing respectively the same number of point sound sources of the same type in the same spatial relationship, the wavefields of two or more of which interact with each other, the spacing of the point sources from each other in the or each of the second arrays being a factor $\alpha$ greater than that of the point sources in the or each of the first arrays and the energy of the elastic radiation emitted by each point source of the or each of the second arrays being greater by a factor $\alpha^3$ than that emitted by its equivalent point source in the or each of the first arrays.

According to a second aspect of the present invention there is provided apparatus for determining the location in the earth of sub-surface boundaries and/or the acoustic properties of sub-surface features in the earth which apparatus comprises one or more first arrays of point sound sources and one or more second arrays of point sound sources, corresponding array(s) of the first and second sources containing the same number of the same type of sources in the same spatial relationship to each other, the spacing of the point sources from each other in each of the second arrays being greater by a factor $\alpha$ than the spacing of the point sources from each other in each of the first arrays, said arrays being adapted respectively to produce sound waves in the earth, each source of each of the second arrays being arranged to emit elastic radiation the energy of which is greater by a factor $\alpha^3$ than that emitted by its equivalent source in each of the first arrays.

Each array of the second source should be located generally in the same position as its corresponding array in the first source, that is to say the centres of the respective arrays should not generally vary in position by more than approximately half a wavelength.

The term "point sound source" as employed throughout this specification means one whose maximum dimension is small compared with the shortest wavelength of the useful radiation it generates.

DESCRIPTION OF THE DRAWING

FIG. 3 illustrates the spatial relationship between two scaled two-dimensional arrays used in a system according to the invention.

DETAILED DESCRIPTION OF THE PREFERRED EMBODIMENT

The solution, at its simplest, is thus to use two arrays, one being a scaled version of the other. If they are used alternately, and for example, one towed behind the other, the shot locations can be made identical and the earth impulse response g(t) will be the same for both shots. In general, we may wish to use p non-interacting first arrays and q non-interacting second arrays, where p and q which may be the same or different each represents an integer greater than or equal to 1.

It is to be noted for a single array the point sound sources within that array need not be identical; the shape of the generated wave form can be usefully varied by suitable selection of the type and size of point sources employed within a single array.

We can solve for g(t) by means of the simultaneous equations $x(t) = ps(t) * g(t)$ $x^1(t) = qs^1(t) * g(t)$ $s^1(t) = \alpha s(t/\alpha)$ wherein
  x(t) represents a first seismic signal
  s(t) represents a first far field source wavelet
  $x^1(t)$ represents a second seismic signal
  $s^1(t)$ represents a second far field source wavelet and in which assumption is made that noise is negligably small.

Moreover, since the source wavelets are not now required to have any special properties—except to obey the scaling law discussed hereinafter, it is not necessary to design the array to accomplish so many tasks. It could for example, be designed simply to produce maximum power over a given bandwidth—irrespective of the duration of the signal and its phase spectrum.

If the far field wavelet of one source is s(t) and the far field wavelet of the scaled source is $s^1(t)$, then our scaling law is:

$$s^1(t) = \alpha s(t/\alpha) \qquad (1)$$

where $\alpha$ is the scale factor and $\alpha^3$ is the ratio of the energy in the second source to the energy in the first.

Consider now the Fourier transform of this equation:

$$S^1(f) = \alpha^2 S(\alpha f), \qquad (2)$$

where the Fourier transform $S^1(f)$ is defined as:

$$S(f) = \int_{-\infty}^{\infty} s(t) e^{-2\pi i f t} dt. \qquad (3)$$

Figure 1:
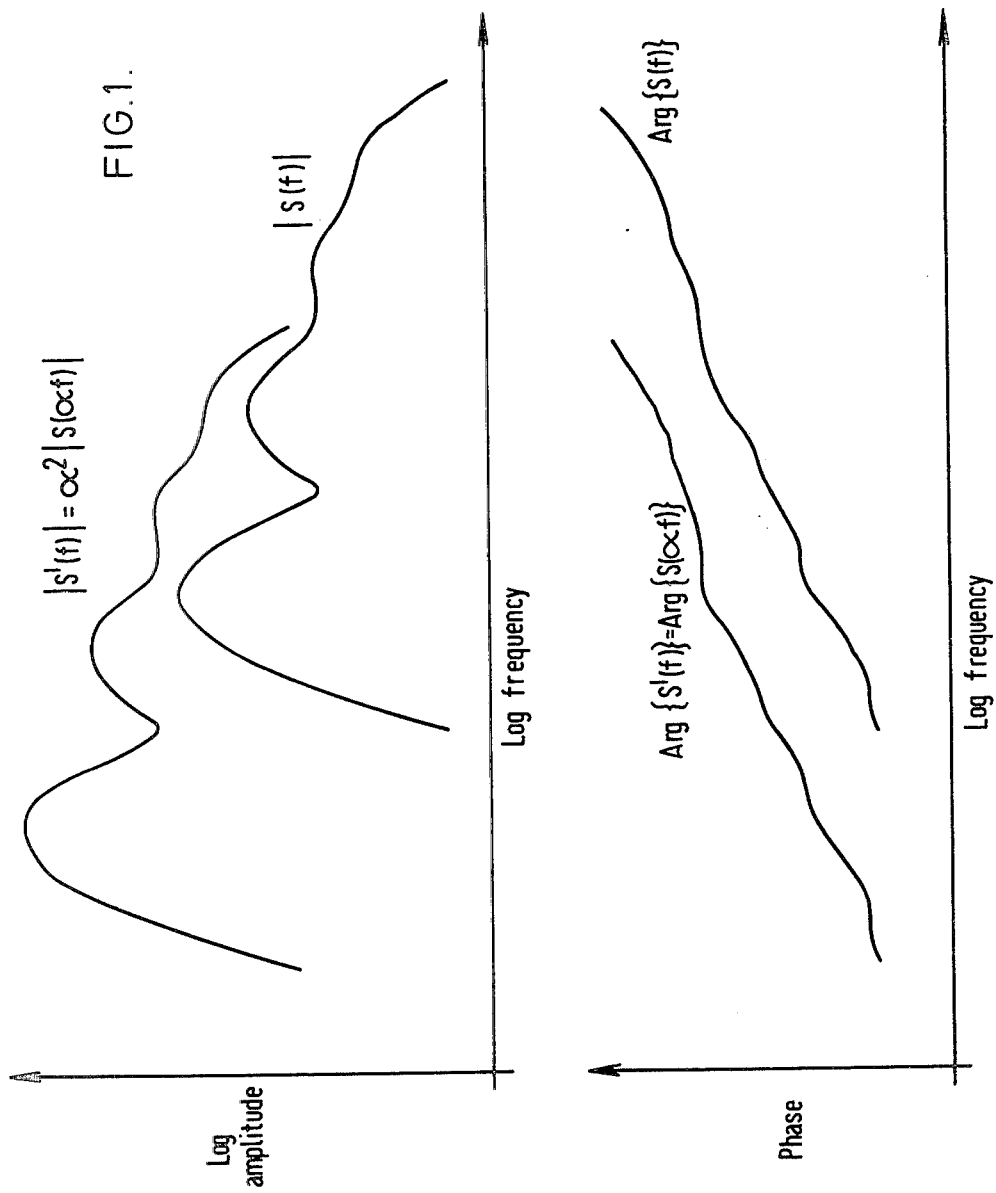
FIG. 1 is a graph showing the amplitude and phase characteristics as a function of frequency of the far field wavelets produced by the first and second arrays showing the frequency and phase shift resulting from the scaling of the arrays.
Figure 2:
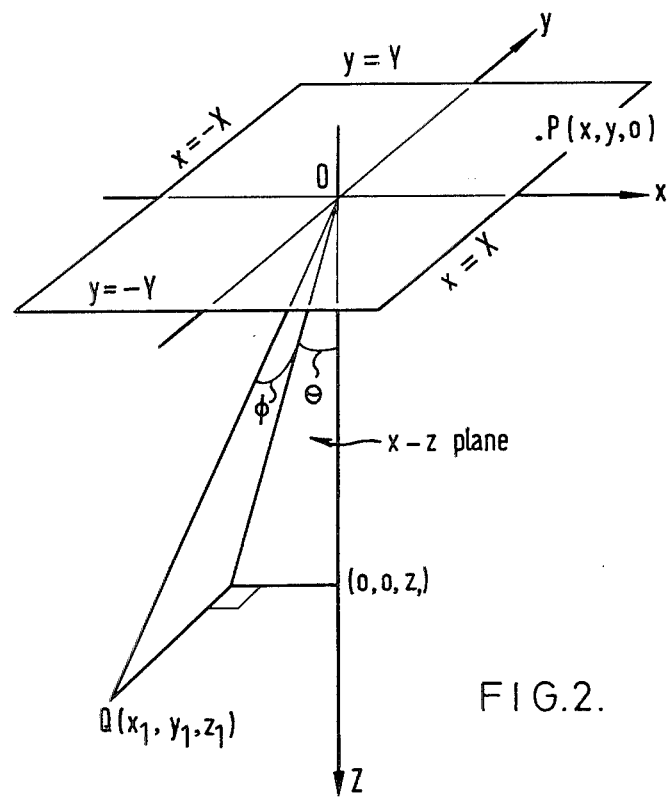
FIG. 2 illustrates a typical two-dimensional array utilized in the system according to the present invention.

Equation (2) states that the spectrum $S^1(f)$ is a shifted, amplified version of $S(f)$, where $\alpha$ is the shift factor and $\alpha^2$ is the amplification factor. If $\alpha$ is greater than 1, $S^1(f)$ is shifted towards the lower frequencies relative to $S(f)$. FIG. 1 illustrates this frequency scaling.

The scaling law expressed either by equation (1) or by equation (2) has no azimuthal dependence. In order to apply the scaling law to the radiation seen at a given point in the far field of two scaled arrays, we must insist that the azimuthal dependence of amplitude and phase are preserved at the scaled frequencies.

It can be readily shown in fact that if the dimensions of a two-dimensional array are scaled by a factor $\alpha$ and if the frequency of the radiation is scaled by a factor $1/\alpha$, then the radiation pattern of the scaled array has the same azimuthal dependence and $\alpha^2$ times the amplitude at the scaled frequency.

For example, a two-dimensional array of air guns could be scaled in this way. If the array operated at a depth d, and pressure p and consisted of a number of guns of volume $V_1$, $V_2$, $V_3$ etc., separated by distances $r_1$, $r_2$, $r_3$, etc., then a scaled array would operate at the same depth d and the same pressure p, but would consist of corresponding guns of volume $\alpha^3 V_1$, $\alpha^3 V_2$, $\alpha^3 V_3$, etc., separated by the corresponding distances $\alpha r_1$, $\alpha r_2$, $\alpha r_3$, etc., as shown in FIG. 3.

In order to apply the ideas of Patent Application No. 79 13997 to two-dimensional arrays of sources of non-infinite extent, the arrays must be scaled. The scaling of the arrays must be performed in the following way:

1. The elements of the array are scaled such that the energy of elastic radiation from each element scales by a factor $\alpha^3$ (corresponding to a frequency scaling factor of $1/\alpha$).
2. The geometry of the array must be correspondingly scaled by a factor $\alpha$.
3. No other parameter should be changed.

It is to be noted that interaction effects between individual source elements of an array will scale in exactly the same way as the spectrum of individual source elements. Thus the scaling law can be used to relate the far field wavelets of scaled arrays even when interaction effects between the elements of an array are significant.

Therefore the method of this invention can be used to find the far field waveform of an array even in situations where it would be impossible to measure it.

It will be understood that the arrays of this invention may employ any suitable sound source such as an air gun, water guns, a marine source employing high pressure steam to cause an implosion such as that available under the Trade Mark "Vaporchoc", sparkers or a marine explosive such as that available under the Trade Mark "Maxipulse".

Likewise the recording apparatus may employ a suitable detector such as for example one or more geophones or hydrophones. The calculation of g(t) from the set of simultaneous equations given previously may be carried out by means of suitable computing apparatus in accordance with the manner indicated in Patent Application No: 79 13997.

Values of $\alpha$ which are suitable in practice are 1.1 to 5, with a value of 1.5 to 3 being preferred. An upper limit to $\alpha$ is imposed by the requirement that the frequencies of the seismic signals of the first and second sources should overlap in some part of the frequency range.

Other features of the method of this invention and elements of the apparatus of this invention may be freely selected in accordance with conventional practice and these will be familiar to those skilled in the art.

I claim:

1. A method of determining the location in the earth of sub-surface boundaries and/or the acoustic properties of sub-surface features in the earth which method comprises employing as a first sound source one or more two-dimensional arrays of point sound sources which point sound sources in a given array are so spaced as to interact with each other, and employing as a second sound source one or more two-dimensional arrays of point sound sources which point sound sources in a given array are so spaced that interaction between the wavefields of two or more of the point sound sources occurs, the or each of the first arrays containing the same number of point sound sources as the or each of the second arrays, respective point sources of the first and second arrays being of the same type and in the same spatial relationship, the spacing of the point sources from each other in the or each sound array being a factor $\alpha$ greater than that of the point sources from each other in the or each first array, and the energy of the elastic radiation emitted by each point source of the or each second array being greater by a factor $\alpha^3$ than that emitted by its equivalent point source in the or each first array, wherein $\alpha$ has a value greater than 1.

2. A method according to claim 1, wherein $\alpha$ has a value of from 1.1 to 5.

3. A method according to claim 1 or 2, wherein $\alpha$ has a value of from 1.5 to 3.

4. A method according to claim 1, wherein each point sound source comprises an air gun, a water gun, a marine or a sub-surface land explosion, an implosive marine source or a sparker.

5. A method according to claim 1, wherein a plurality of identical signals is summed to generate said first seismic signal.

6. A method according to claim 5, wherein said plurality of identical seismic signals is obtained by producing a series of identical sound waves by the use of one or more identical arrays of sound sources.

7. A method according to claim 1, wherein a plurality of identical seismic signals is summed to generate said second seismic signal.

8. A method according to claim 7, wherein said plurality of identical seismic signals is obtained by producing a series of identical sound waves by the use of one or more identical arrays of sound sources.

9. A method according to claim 1, wherein a plurality of identical non-interacting arrays of sound sources is employed simultaneously to produce said first sound wave.

10. A method according to claim 1, wherein a plurality of identical non-interacting arrays of sound sources is employed simultaneously to produce said second sound wave.

11. Apparatus for determining the location in the earth of sub-surface boundaries and/or the acoustic properties of sub-surface features in the earth which apparatus comprises one or more identical, non-interacting first spaced two-dimensional arrays of point sound sources and one or more identical, non-interacting second spaced two-dimensional arrays of point sound sources the wavefields produced by two or more of the point sound sources in each said array being arranged in use to interact with each other, corresponding array(s) of the first and second sources containing the same number of the same type of sources in the same spatial relationship to each other, the spacing of the point sources from each other in each of the second arrays being greater by a factor $\alpha$ than the spacing of the point sources from each other in each of the first arrays, said arrays being adapted respectively to produce sound waves in the earth, each source of each of the second arrays being arranged to emit elastic radiation the energy of which is greater by a factor $\alpha^3$ than that emitted by its equivalent source in each of the first arrays, wherein $\alpha$ has a value greater than 1.

12. Apparatus according to claim 11, wherein said second sound source comprises one or more identical arrays of sound sources arranged to produce a series of identical sound waves and the receiver includes means for summing said series of identical sound waves to produce second seismic signal.

13. Apparatus according to claim 11, wherein said first sound source comprises a plurality of identical non-interacting arrays of sound sources arranged to produce simultaneously said first sound wave.

14. Apparatus according to claim 11, wherein said second sound source comprises a plurality of identical non-interacting arrays of sound sources arranged to produce simultaneously said second sound wave.

15. Apparatus according to claim 11, wherein the point sound sources of the arrays are selected from air guns, water guns, marine explosions, sub-surface land explosions, implosive marine sources or sparkers and wherein different point source in an array may be the same or different.

16. Apparatus according to claim 11, wherein $\alpha$ is selected to be from 1.1 to 5.

17. Apparatus according to claim 15, wherein $\alpha$ is selected to be from 1.5 to 3.

* * * * *